No. 811,015. PATENTED JAN. 30, 1906.
J. T. WHALEN.
VEHICLE RECORDER.
APPLICATION FILED MAY 27, 1905.

4 SHEETS—SHEET 1.

Attest:
Edgeworth Greene
D. O. McGinn

Inventor:
John T. Whalen
by F. W. Barker Atty.

No. 811,015. PATENTED JAN. 30, 1906.
J. T. WHALEN.
VEHICLE RECORDER.
APPLICATION FILED MAY 27, 1905.

4 SHEETS—SHEET 2.

Attest:

Inventor:
John T. Whalen
by _____ Att'y.

No. 811,015. PATENTED JAN. 30, 1906.
J. T. WHALEN.
VEHICLE RECORDER.
APPLICATION FILED MAY 27, 1905.
4 SHEETS—SHEET 3.
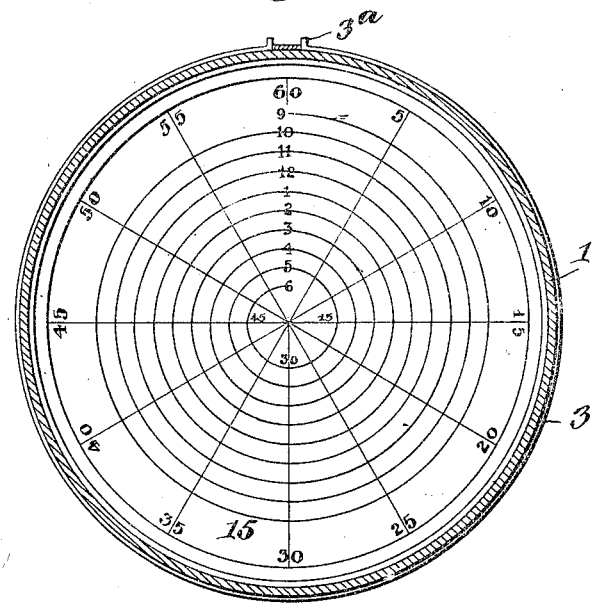
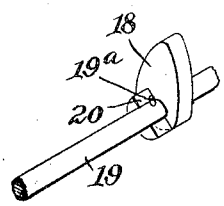
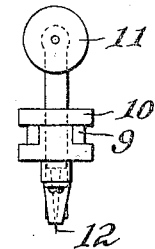

No. 811,015.   
PATENTED JAN. 30, 1906.
J. T. WHALEN.
VEHICLE RECORDER.
APPLICATION FILED MAY 27, 1905.
4 SHEETS—SHEET 4.
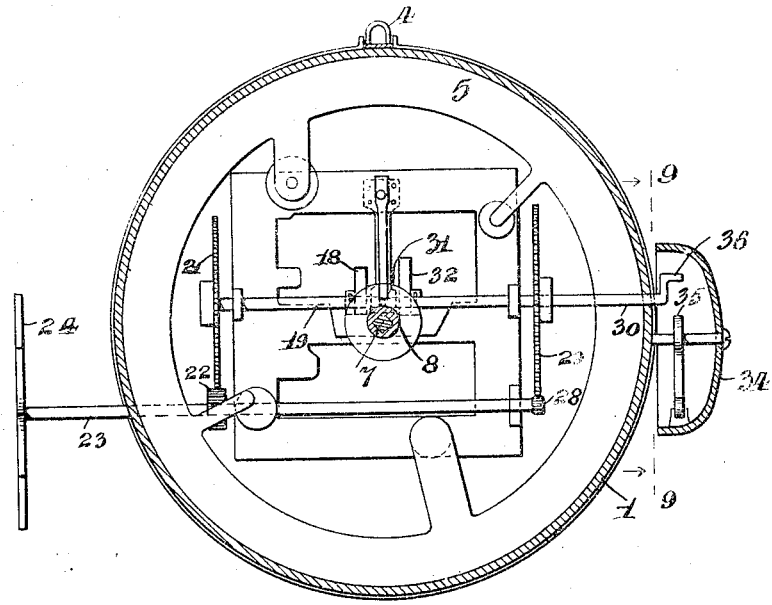
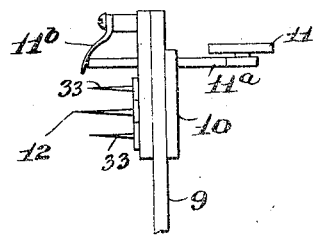
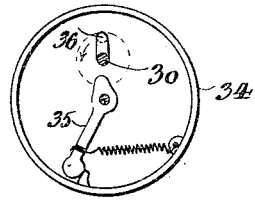
Attest:   
Inventor:   
John T. Whalen   
by _____ Atty.

UNITED STATES PATENT OFFICE.

JOHN T. WHALEN, OF BROOKLYN, NEW YORK.

VEHICLE-RECORDER.

No. 811,015.

Specification of Letters Patent.

Patented Jan. 30, 1906.

Application filed May 27, 1905. Serial No. 262,699.

*To all whom it may concern:*

Be it known that I, JOHN T. WHALEN, a subject of the King of England, and a resident of the borough of Brooklyn, in the county of Kings and State of New York, have invented certain new and useful Improvements in Vehicle-Recorders, of which the following is a specification.

This invention relates to recording instruments for use on vehicles to indicate the distance traveled in a given time, the speed of travel, and the time and duration of stops.

My invention is adapted for use with either horse-drawn vehicles or motor-cars, and is mainly intended for employment with delivery-wagons to serve as a check upon the drivers and to promote their faithful performance of their duties.

In brief, my invention comprises an ordinary clock having a reversed removable dial on which the divisions of time are marked in convolute form. The minute-hand carries a slidable pointer or marker, which is caused to traverse a corresponding convolute way or track, and mechanism operated through the motion of a wheel of the vehicle actuates said pointer or marker once in a given number of revolutions of the vehicle-wheel to create an indication upon the time-dial and record the time of its occurrence.

Figure 1:
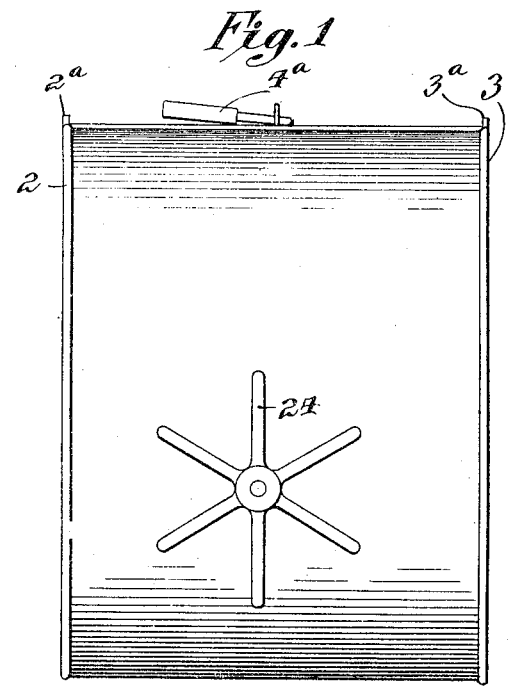
Figure 2:
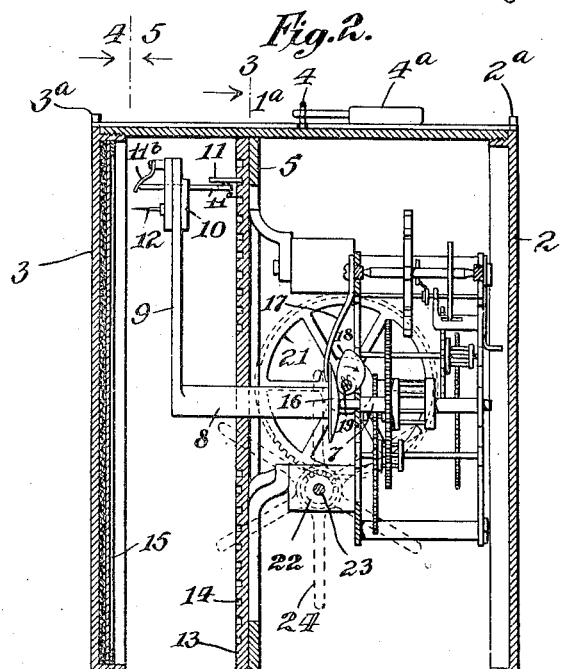
Figure 3:
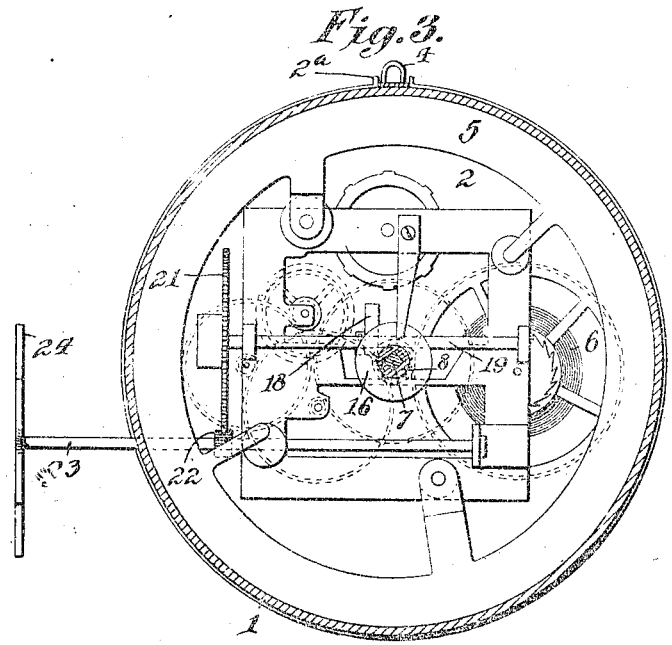
Figure 4:
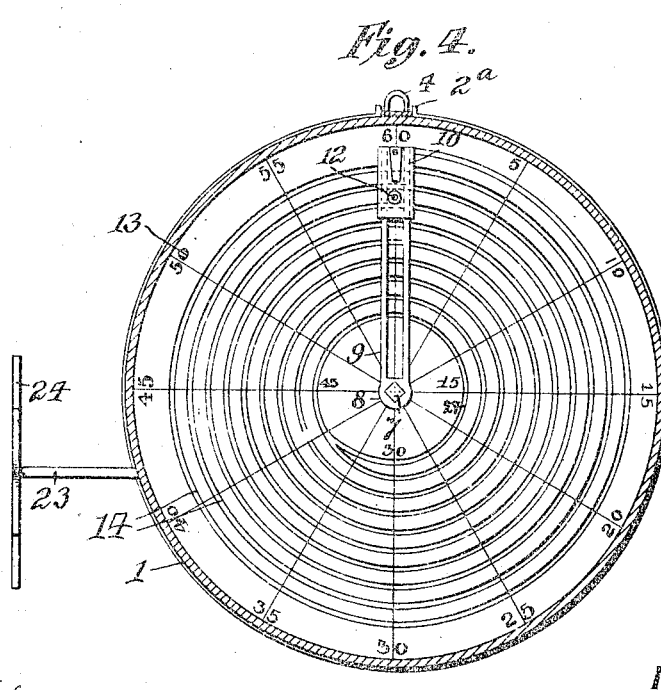

In the drawings accompanying this application, Figure 1 is a vertical elevation of my apparatus. Fig. 2 is a vertical side section thereof. Fig. 3 is a front view with the face removed, taken on the line 3-3 of Fig. 2. Fig. 4 is a front view of the convolute way or track, taken on the line 4 4 of Fig. 2. Fig. 5 is a view of the time-disk, taken on the line 5 5 of Fig. 2. Fig. 6 is an enlarged detail of the cam for actuating the indicator. Fig. 7 is a top plan detail view of the slide-block, guide-wheel, and marker. Fig. 8 is a front elevation of my apparatus, the front cover being removed, showing auxiliary mechanism for actuating visual and audible distance-indicators. Fig. 9 is a detail of the bell employed, and Fig. 10 is a detail of the visual indicator.

In said figures the numeral 1 indicates the case containing the mechanism, which case may be cylindrical, as shown, or of other conformation. 2 indicates the removable back, which may be screwed into the case, as seen, or secured thereto in any other suitable manner, and 3 indicates the removable front cover, which may also be held in place by screwing or otherwise. Means for locking said covers 2 and 3 in place to prevent their unauthorized removal may be provided—such, for example, as the bar $1^a$, entered in slots $2^a$ $3^a$ in the back and front covers, respectively, and said bar being slotted and adapted to pass over a staple, as 4, which is adapted to receive a lock, as $4^a$.

Supported from a frame, as 5, within the case is a train of time mechanism, actuated by a mainspring, as 6, and of ordinary character, the squared shaft 7 being adapted to be rotated thereby at the rate of one revolution per hour. This squared shaft carries a slidable sleeve, as 8, from whose outer end extends a radial arm 9, which carries a slide 10, having a traveler 11 in the form of a wheel, and an indicator 12 in the form of a sharp-pointed instrument. A disk, as 13, having a convolute depression 14 at one side, is disposed and secured within the case in manner to permit the wheel 11 to travel in said convolute depression, as within a way or guide. A removable disk 15, as of paper, and radially marked to indicate divisions of time, is fitted within the cover 3 in position to be pierced or marked by the pointer 12. Said disk 15 is also marked with a series of concentric convolute circles corresponding with the convolute depression on the disk 13 and respectively marked to denote successive hours.

It is desirable that the sleeve 8 shall periodically move outwardly upon the shaft 7 and be automatically retracted after each outward movement. This is to enable the pointer 12 to mark the disk 15 to register the time during which the vehicle is in motion and the speed of its travel. To this end said sleeve 8 is provided with a hub 16, against which a spring 17 presses to hold said sleeve normally retracted. The opposite side of said hub 16 is given a curved contour and is located in the path of a cam 18, that is loose upon a shaft 19, but adapted to be turned by the rotation of said shaft through the medium of a pin or lug $19^a$, projecting from said shaft and arranged to meet a shoulder or extension 20 of said cam. The shaft 19 carries and is rotated by a gear-wheel 21, which is in mesh with a pinion 22, that is fast upon a shaft 23, (which may be flexible or rigid,) said shaft also carrying a star-wheel, as 24, or like contrivance, capable of being struck and moved by an actuator (not shown) with every revolution of a vehicle-wheel in the manner of a cyclometer.

When the vehicle-wheel has rotated a certain number of times, representing a given distance traveled by the vehicle, the star-wheel 24 will have been struck with corresponding frequency to turn the gear-wheel 21 and shaft 19 one complete revolution, which movement, being communicated to the cam 18, causes it to move the sleeve 8 and impinge the pointer 12 once against the disk 15. Because the cam 18 is loose upon shaft 19 it will immediately after moving the sleeve 8 outwardly be swung out of the path of the hub 16 through the tension exerted by the spring 17 against the hub 16 and said cam, the sleeve 8 thereby being retracted automatically and expeditiously.

As will be evident from the foregoing general description and from an inspection of the drawings, the arm 9 will make a complete revolution once in every hour, the slide 10 moving inwardly upon said arm as the wheel 11 travels convolutely in the groove or way 14, and the pointer 12 will accordingly be brought into position to mark succeeding circles of the convolute series. Since a given number of pricks produced on the disk 15 by the pointer 12 will indicate the distance traveled by the vehicle, it follows that a reading of the period of time occupied in the production of that number of pricks will determine the speed with which the vehicle had traversed that particular distance. If the vehicle be at rest for a certain period of time, no marks will be made by the pointer 12 upon disk 15 during such term of inactivity, because the cam 18 is not then operating; but when the vehicle is again set in motion the recording apparatus will resume its functions, indicating and recording thereby the time of the termination of the stop and of the beginning of the new travel.

The arm 9, which is actuated by the time-train in the manner of the minute-hand of a clock, serves as a slideway for the slide 10, its form being of a character to minimize frictional resistance, and thus not impede its circular motion. To this end said arm may comprise the two parallel bars or rods $9^a 9^a$, (clearly shown in Figs. 4 and 7,) while the slide 10 consists of a block having grooves $10^a 10^a$ in its opposite sides, whereby it is slidingly fitted to said bars. Slidably fitted within a slot therefor in the block 10 is a bar or rod $11^a$, which pivotally carries at one end the wheel 11, while a spring $11^b$, secured to the block 10, exerts tension against the opposite end of said bar or rod to maintain the wheel 11 in position within the groove 14, thus overcoming the tendency of said wheel to leave said groove when the sleeve 8 is moved outwardly through the cam action previously described. In other words, while the pointer 12 is being moved toward the disk 15 the spring $11^b$ presses the bar or rod $11^a$ with wheel 11 toward the disk 13, this being essential to preserve the relative positions of the several members.

I may place within the front cover 3 a soft packing or cushion 25, as of felt, to serve as a backing for the disk 15 to facilitate piercing the latter with the pointer 12 and to avoid blunting said pointer through contact with a hard substance. A ring or washer 26 may removably hold the disk 15, also the packing 25, within the front cover.

While the disk 15, for the sake of example, is marked with a convolute indication whose complete turns, to the number of ten, of diminishing radii each represent an hour's circular travel of the arm 9, it is obvious that a greater or less number of turns may be indicated to suit the convenience of the user. Assuming a disk, as represented in Fig. 5, to be employed and the turns marked to indicate the hours of the day from nine a. m., then the pointer 12 should be set at that point at nine a. m., if that be the time when the vehicle is put in commission for the day. Supposing the time of starting out to be 12.15 p. m., then the arm 9 should be turned by hand until the pointer 12 is upon the star indicated on the turn extending from the number "12" on the disk, that being at a point ninety-five degrees from the radial starting-line, and hence indicating a period of fifteen minutes after the hour. The pointer 12 will produce a series of pricks or perforations in the disk following the convolute line thereon, the number of such pricks or perforations within any given period represented between the first and last thereof indicating the distance traveled, the same being determined by the diameter of the actuating vehicle-wheel and the number of revolutions thereof requisite to revolve the gear-wheel 21 and actuate the cam 18.

A new disk should be placed by the employer within the case and the latter locked before each day's run and removed by him at the end thereof. It affords him a record of the vehicle's performance during the day, and thus enables him to verify his driver's report.

The disk 13, whose convolute depression or way enables the pointer 12 to follow the convolute marking upon disk 15, is provided with a central concentric groove 27, continued from the inner turn of the convolute groove, the purpose whereof is to allow the wheel 11 to circle around therein without leaving the track should the slide 10 not be reset after completing its travel.

In order to particularly adapt my improved recording apparatus for use in recording the speed of travel of vehicles, as of motor-cars or wagons drawn by fast horses, also of audibly indicating such speed, I have added certain coacting parts to the foregoing mechanism. These parts are illustrated in Figs. 8, 9, and 10 and are as follows: The shaft 23, which carries the pinion 22, is lengthened (see Fig. 8) and carries another smaller pinion 28, which meshes with a gear-wheel 29, that is of greater diameter than the gear-wheel 21. The shaft 30, which carries gear 29, may be in axial alinement with the cam-shaft 19 and journaled in a common bearing, as 31, with the latter. Said shaft 30 also carries a cam, as 32, of relatively greater size than cam 18, but like it adapted to bear against the hub 16 to move the sleeve 8 outwardly. Where the auxiliary cam 32 and its mechanism are employed, I change the form of the pointer or marker 12 to render it capable of producing different indications according to its actuation by the cams 18 or 32. Thus I add one or more shorter pointers, as 33, ranging them in a vertical line with pointer 12 and extending from the same support; but whereas the pointer 12 pierces or marks the disk 15 under the impulse emanating from cam 18 the pointers 33 in this action fail to reach said disk, because they are of insufficient length. When the larger cam 32, however, impels the sleeve 8 forwardly, the greater range of movement thus produced causes the shorter pointers 33, as well as the pointer 12, to penetrate the disk, thereby marking it with a series of three perforations in a vertical line. Of course I do not intend as arbitrary this particular form of marking, but mean it as an example distinguishable from the ordinary form of marking in single pricks or perforations. The cam 32 may be set to actuate the triple pointers, say, at every quarter-mile, half-mile, or mile, and consequently in reading the disk 15 it will be only necessary to note the triple pricks or perforations to ascertain the distance traveled and the time occupied in covering each particular stretch. The cam-shaft 30, which may extend outside the casing, may be adapted to actuate a bell or gong in synchronism with the marking of the disk by the triple pointers at the completion of a given distance traveled by the vehicle. Any ordinary bell or gong mechanism may be employed for this purpose, that shown being a bell, as 34, secured to the side of the case 1, a spring-held tongue or clapper 35, pivotally supported, and a lug or finger 36 upon the shaft 30, arranged to trip said tongue or clapper synchronously with the actuation of sleeve 8 by cam 32. In this manner an audible signal will indicate to the driver the distance traveled, whereby with the aid of a timepiece he can compute his rate of speed while driving and without referring to the recording apparatus.

Having now described my invention, I declare that what I claim is—

1. In vehicle recording apparatus, a time-train having a prime mover and a shaft rotated thereby, a stationary record-disk having divisions of time indicated thereon in convolute form, a marker, means actuated by said shaft to rotate said marker, means imparting radial movement to said marker in its rotation, and mechanical means controlled by the movement of the vehicle for intermittently moving said marker toward said disk.

2. In vehicle recording apparatus, a time-train having a prime mover and a shaft rotated thereby, a stationary record-disk having divisions of time indicated thereon in convolute form, a slidable extension for said shaft, a radial arm carried by said extension and a marker extending from said arm, together with means imparting convolute movement to said marker in its rotation.

3. In vehicle recording apparatus, a time-train having a prime mover and a shaft rotated thereby, a stationary record-disk having divisions of time indicated thereon in convolute form, a slidable extension for said shaft, a radial arm carried by said extension and a marker extending from said arm, together with means imparting convolute movement to said marker in its rotation, and means controlled by the movement of the vehicle for intermittently moving said marker toward said disk.

4. In vehicle recording apparatus, a time-train having a prime mover and a shaft rotated thereby, a sleeve rotatable with and slidable upon said shaft, an arm extending radially from said sleeve, a slide upon said arm, carrying on opposite sides a pointer and a wheel, a disk having a convolute groove or way to receive said wheel, a disk having divisions of time marked thereon in convolute form, means controlled by the movement of the vehicle to intermittently impel said pointer against said disk, means retracting said pointer, and means retaining the wheel within its groove or way during the impulses of the pointer.

5. In vehicle recording apparatus, a record-disk having divisions of time indicated thereon in convolute form, a marker adapted to rotate convolutely in proximity to said disk, a time-train to actuate said marker, a cam to move said marker intermittently against said disk, to register indications thereon, and means communicating motion from a wheel of the vehicle to said marker.

6. In vehicle recording apparatus, a record-disk having divisions of time indicated thereon in convolute form, a marker adapted to rotate convolutely in proximity to said disk, a time-train to actuate said marker, a cam to move said marker intermittently against said disk, to register indications thereon, means retracting said marker, and means communicating motion from a wheel of the vehicle to said cam.

7. In vehicle recording apparatus, a record-disk, a duplex marker adapted to rotate in proximity to said disk, separate cams adapted to move said marker intermittently against said disk in manner to register different indications thereon, and means communicating motion from a wheel of the vehicle to said cams, causing them respectively to actuate the marker at the completion of set less and greater distances traveled.

8. In vehicle recording apparatus, a record-disk having divisions of time indicated thereon in convolute form, a marker adapted to rotate convolutely in proximity to said disk, a time-train to actuate said marker, a cam to move said marker intermittently against said disk, to register indications thereon, a cam-shaft, an audible signal device, means upon said cam-shaft to intermittently actuate said signal, and means communicating motion from a wheel of the vehicle to said cam-shaft.

9. In vehicle recording apparatus, a record-disk having divisions of time indicated thereon in convolute form, a marker adapted to rotate convolutely in proximity to said disk, a time-train to actuate said marker, a cam-shaft, means communicating motion from a wheel of the vehicle to said cam-shaft, a cam loose upon said cam-shaft to move said marker intermittently against said disk, means upon said cam-shaft to rotate the cam therewith, and tensional means for moving the cam at the end of the marker movement in advance of the rotation of the cam-shaft.

Signed at New York this 24th day of May, 1905.

JOHN T. WHALEN.

Witnesses:
 FREDERICK C. BONNY,
 F. W. BARKER.